United States Patent
Kress et al.

[11] Patent Number: 5,857,813
[45] Date of Patent: Jan. 12, 1999

[54] BORING TOOL

[75] Inventors: Dieter Kress, Aalen; Friedrich Häberle, Lauchheim, both of Germany

[73] Assignee: Mapal, Fabrik fur Prazisionswerkzeuge Dr. Kress KG

[21] Appl. No.: 824,284

[22] Filed: Mar. 26, 1997

[30] Foreign Application Priority Data

Mar. 26, 1996 [DE] Germany ......................... 196 11 891.3
Oct. 22, 1996 [DE] Germany ......................... 196 43 590.0

[51] Int. Cl.⁶ ........................................................ B23B 35/00
[52] U.S. Cl. ............................ 408/1 R; 82/1.2; 408/153; 408/157
[58] Field of Search .................. 408/1 R, 153, 408/157, 158; 82/1.2, 1.4

[56] References Cited

U.S. PATENT DOCUMENTS

| | | | |
|---|---|---|---|
| 1,346,105 | 7/1920 | Bosse | 408/153 |
| 2,278,631 | 4/1942 | Young | 408/157 |
| 2,517,668 | 8/1950 | Howald | 408/153 |
| 3,094,016 | 6/1963 | Kleine | 408/153 |
| 3,101,631 | 8/1963 | Huff | 408/153 |
| 3,711,216 | 1/1973 | Zurcher | 408/153 |
| 4,105,360 | 8/1978 | Keller | 408/118 |
| 4,343,576 | 8/1982 | Lagerholm et al. | 408/157 |
| 4,345,860 | 8/1982 | Shashaty | 408/1 R |
| 4,954,024 | 9/1990 | Kress et al. | 408/153 |

FOREIGN PATENT DOCUMENTS

| | | |
|---|---|---|
| 1200645 | 9/1965 | Germany . |
| 2910341 | 4/1982 | Germany . |
| 4022579 | 1/1991 | Germany . |
| 4402503 | 8/1995 | Germany . |
| 19515205 | 11/1995 | Germany . |

*Primary Examiner*—Daniel W. Howell
*Assistant Examiner*—Adesh Bhargava
*Attorney, Agent, or Firm*—Ostrolenk, Faber, Gerb & Soffen, LLP

[57] ABSTRACT

A boring tool for the fine finishing of surfaces of holes having at least one cutting bit and at least one guide ledge which are introduced and fixed in place in grooves arranged in the circumferential surface of the base body of the boring tool, characterized by the fact that a setting device is provided which is positively coupled with at least two cutting bits associated with each other; that the cutting bits are arranged displaceable by means of the setting device in the base body with respect to the circumferential surface; that the association of the cutting bits consists in that they are displaceable in opposite directions, with respect to the axis of rotation or center line of the boring tool; and that the setting device in each case displaces one cutting bit into a working position and the other cutting bit into a position of rest.

24 Claims, 3 Drawing Sheets

BORING TOOL

BACKGROUND OF THE INVENTION

The present invention relates to a boring tool and a method for the fine finishing of the surfaces of holes.

Boring tools as well as methods for the fine finishing of the surfaces, of holes are known. It has been found that several steps are frequently necessary, for which furthermore several different tools must be used. This means a changing of the tool, which substantially increases the cost of the fine finishing of the surface of the holes.

SUMMARY OF THE INVENTION

An advantageous feature of the present invention is to provide a boring tool and a method which do not have these disadvantages.

In order to achieve this feature, a boring tool may have a setting device which is positively coupled with at least two cutting bits which are associated with each other. The setting device serves to displace the cutting bits with respect to the circumferential surface, preferably perpendicular to the center line of the tool, the cutting bits being displaced in opposite directions with respect to the center line. In each case, one of the cutting bits is shifted by the setting device into a working position and the other bit is shifted into a position of rest. In this way, it is possible to effect a preliminary machining of the surface of the hole with the one cutting bit and a subsequent or final machining of the surface of the hole with the other cutting bit. Thus, no change in tool is necessary, so that the machining of the surface of the hole can be effected in a substantially shorter period of time, thereby saving expense.

In a specific embodiment of the boring tool, the cutting bits are inserted in holding devices, also known as cassettes. The cassettes can be displaced as a whole in radial directions by means of the setting device which can exert both a pulling force and a pushing force on the cutting bits or holding devices so as to move the cutting bits in and out. By the use of the holding devices, it is possible to dependably fix the cutting bits in place and couple them with the setting device.

According to another aspect of the boring tool, the setting device forms a wedge-friction gear with the holding devices, wherein corresponding wedge and oblique surfaces of the setting device and of the holding devices cooperate with each other. The displacement of the cutting bits or holding devices thus is possible in a simple, disturbance-free manner.

According to the above-mentioned method, the preliminary machining of the surface of the hole is effected during a first movement of the boring tool along its center line and the final machining is effected during a second movement in opposite direction. During the first movement, the first cutting bit is moved into its working position, while the second cutting bit is in its position of rest. Upon the second axial movement of the tool, the cutting bits are in the opposite positions. Thus, there is a change in the cutting bits for the two machining operations.

Other features and advantages of the present invention will become apparent from the following description of the invention which refers to the accompanying drawings.

BRIEF DESCRIPTION OF THE DRAWINGS

Embodiments of the invention will be explained in further detail below with reference to the drawings, in which.

DETAILED DESCRIPTION OF EMBODIMENTS OF THE INVENTION

In normal function of the boring tool, the boring tool is placed in rotation and introduced into the hole to be machined. In this connection, at least one cutting bit of the tool can enter into engagement with the surface of the hole so that a machining of the surface takes place. In principle, however, it is also conceivable to hold the boring tool stationary and to place the work piece in which the hole is to be produced in rotation, thereby producing relative movement of the work piece with respect to the tool, so that the boring tool extends into the hole and the machining of the surface of the hole takes place. Thus, in the final analysis, it is sufficient to have relative rotation between the boring tool and the hole in the work piece, on which there is superimposed a relative axial movement in the direction of the center line axis of rotation of the tool or hole, as the case may be.

Figure 1:
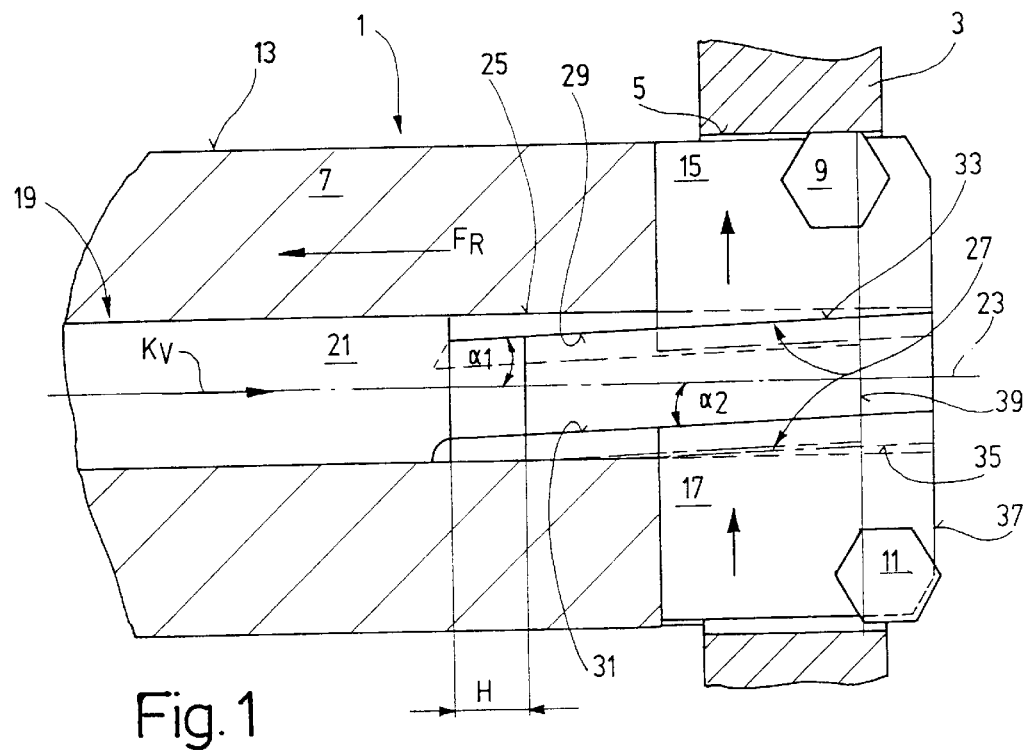
FIG. 1 is a diagrammatic longitudinal section through the front end of a first embodiment of a boring tool, in which a first working position of the cutting bits is shown.

FIG. 1 shows the front end of a boring tool 1 in longitudinal section during the machining of a work piece 3, such as the machining of the surface of the hole 5 of a connecting rod. The boring tool, hereinafter referred to merely as tool 1, carries out during a movement of rotation an advancing movement, which takes place from left to right in the showing in FIG. 1. The direction of advance is indicated by an arrow $K_v$.

The tool 1 has a base body 7, into which cutting bits 9 and 11 are inserted. The cutting bits are inserted directly into grooves which are provided in the circumferential surface 13 of the base body 7. Holding devices 15 and 17, also known as cassettes, are also provided, into which the cutting bits 9 and 11 are inserted and with which the cutting bits are firmly clamped, as will be discussed in more detail below.

The tool 1 is provided with a setting device 19 which comprises a setting bar 21 which is displaceably mounted in a recess 25 in the base body 7 of the tool 1, said recess extending concentrically along the center line or axis of rotation 23. The movement of displacement of the setting bar 21 takes place in the direction of the center line 23. The setting bar 21 forms a wedge-friction gear 27 either directly with the cutting bits 9 and 11 or—as shown here—with the holding devices 15 and 17. For this purpose, the setting bar 21 is provided with wedge surfaces 29 and 31 which cooperate with oblique surfaces 33 and 35 on the holding devices 15 and 17. The wedge surfaces 29 and 31 extend in this connection parallel to each other and form an acute angle $\alpha$ with the center line 23, the angle $\alpha_1$ of the wedge surface 29 being open in the direction towards the end surface 37 of the tool 1, while the angle $\alpha_2$ of the wedge surface 31 is open in the opposite direction. The oblique surfaces 33 and 35 extend parallel to the wedge surfaces 29 and 31 respectively, so that in this example the angle $\alpha_1$ and the angle $\alpha_2$ are the same.

In the embodiment shown here, the two cutting bits 9 and 11 are arranged diametrically opposite each other in the base body 7 of the tool 1. In corresponding manner, the wedge surfaces 29 and 31 and the corresponding oblique surfaces 33 and 35 of the holding devices 15 and 17 are arranged diametrically opposite each other.

Upon the advancing movement of the tool 1 in the direction $K_v$, the setting bar 21 is in its completely withdrawn position, so that the end surface 39 of the setting bar 21 is at a distance H from the end surface 37 of the tool 1. H is the stroke of the setting bar 21. By a force $F_R$, characterized by an arrow, which acts opposite the direction of advance $K_v$, the holding device 15 or the cutting bit 9 is moved radially outward with respect to the center line 23, while the holding device 17 or the cutting bit 11 is moved radially inward with respect to the center line 23. The directions of movement of the two holding devices or cutting bits are indicated by arrows in FIG. 1. With respect to the base body 7 of the tool 1, the cutting bits 9 and 11 thus move in the same direction. If one considers the movement with respect to the center line 23, the movement of the cutting bits or holding devices due to the restoring force $F_R$ of the setting bar 21, which can also be referred to as the rod, is in the opposite direction.

By the backward movement of the setting bar 21, the cutting bit 9 is therefore moved into its radially outer working position, in which the cutting bit subjects the surface 5 of the hole of the work piece 3 to preliminary machining. Upon this machining, the opposite cutting bit 11 is in its position of rest, i.e. it is not in engagement with the surface 5 of the hole.

By the movement of advance of the tool 1, the cutting bit 9 finally comes out of the surface 5 of the hole.

Figure 2:
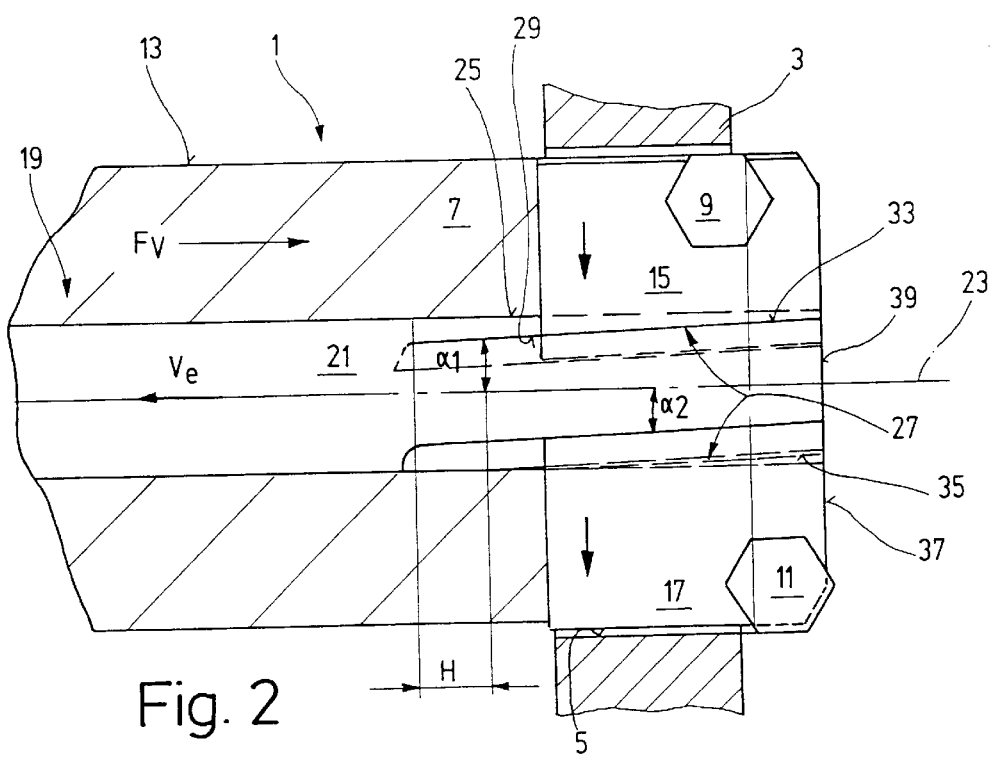
FIG. 2 is a diagrammatic view corresponding to FIG. 1, the cutting bits being shifted into a different working position.

Next, the bar 21 is moved with a forward-directed force $F_v$, as indicated by an arrow in FIG. 2, in this case, by way of example, until the end 39 of the setting bar 21 is flush with the end surface 37 of the tool 1. By the action of the wedge-friction gear 27, the cutting bit 9 or the corresponding holding device 15, as indicated by an arrow, is moved inward in direction towards the axis of rotation or center line 23, while the opposite cutting bit 11 and the corresponding holding device 17 are moved outward, as is also indicated by an arrow in FIG. 2. The displacement of the cutting bit 9 into a position of rest and the moving of the cutting bit 11 into a working position after completion of the preliminary machining, and therefore after the cutting bits 9 and 11 have passed through the hole, effects a switching of the tool 1 from preliminary machining to fine finishing.

The cutting bit 9 or 11 can, in its position of rest, be held completely within the base body 7, i.e. it does not protrude from the circumferential surface 13 of the base body 7. It is important to note that the relative movement of the cutting bits 9 and 11 with respect to the base body 7 and the circumferential surface 13, which is brought about by the setting device 19, can take place at any angle to the center line 23, preferably perpendicular to it in this example, such that the corresponding cutting bit is moved into its working position where it can machine the work piece 3, and into its position of rest, out of engagement with the machining surface.

Therefore, the view in FIG. 2 differs from that in FIG. 1 only by the fact that the cutting bits 9 and 11 and the corresponding holding devices 15 and 17 have been moved into their opposite positions. The cutting bit 9 is now in its position of rest, while the cutting bit 11 is in its working position. A reversal of the direction of advance of the tool 1 now takes place. The tool 1 is now moved from right to left through the hole in the work piece 3 so that the surface 5 of the hole can now be subjected to a final machining by the cutting bit 11. The return travel of the tool 1, or the direction of return, is indicated by an arrow $V_e$.

In FIG. 1 and FIG. 2, identical parts have been provided with the same reference numerals so that, to this extent, reference can be had to the description of FIG. 1.

Figure 3:
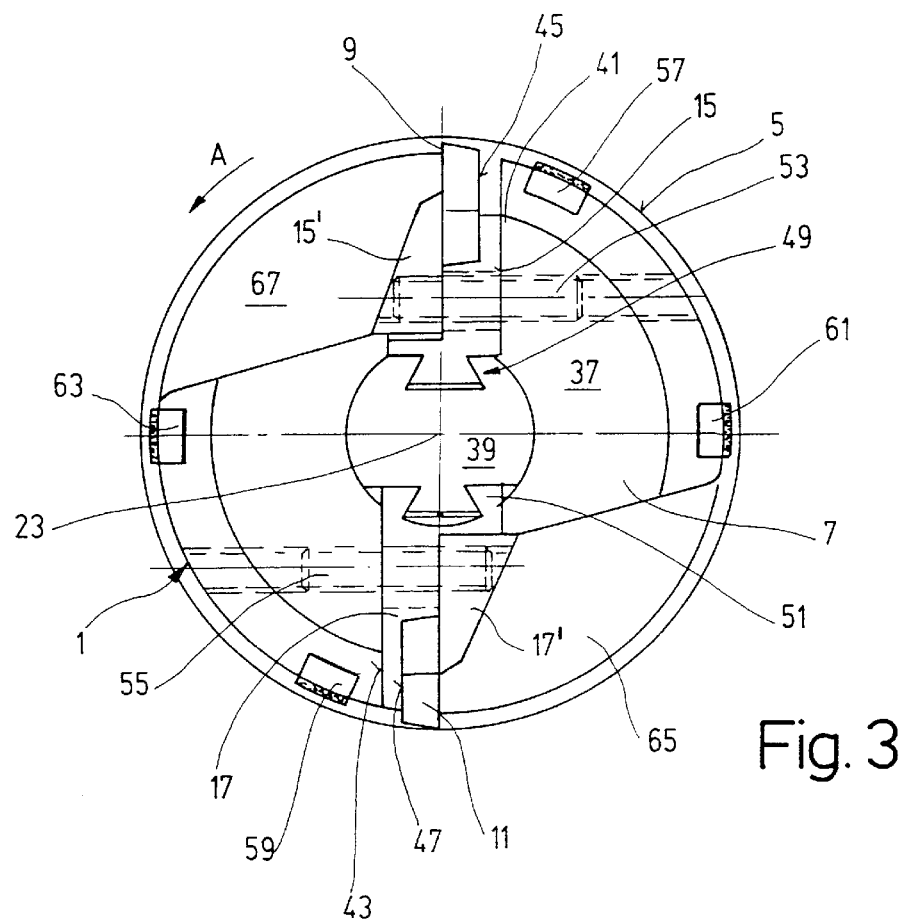
FIG. 3 is an end view of the tool shown in FIGS. 1 and 2.

FIG. 3 is a view of the end 37 of the tool 1 and the end 39 of the setting bar 21. The surface 5 of the hole is indicated by a circular line. Parts which agree with those shown in FIGS. 1 and 2 bear the same reference numerals, so that to this extent reference can be had to the description of FIGS. 1 and 2.

In FIG. 3 it is shown that the tool 1 has two cutting bits 9 and 11 which are associated with each other and, under the influence of the setting device 19, move in opposite directions with respect to the center line 23. In FIG. 3, the cutting bit 11 is in its working position and the cutting bit 9 is in its position of rest. The end view shows that the holding devices 15 and 17 are placed in grooves 41 and 43 which are provided in the base body 7 of the tool 1. In corresponding fashion, the cutting bits 9 and 11 are placed in grooves 45 and 47 arranged in the holding devices 15 and 17.

FIG. 3 shows further that the wedge surfaces 29 and 31 and the oblique surfaces 33 and 35 rest firmly against each other when the corresponding cutting bits 9 or 11 are in their working position. The pressing forces necessary for the machining of the surface 5 of the hole are therefore introduced into the tool 1 via the surfaces 29, 31, 33 and 35. In the region of these surfaces, the setting bar 21 and the holding devices 15 and 17 are coupled to each other by a form-lock connection. For this purpose, a so-called dovetail connection 49 between the setting bar 21 and the holding device 15 and a second dovetail connection 51 between the setting bar 21 and the holding device 17 are provided. Due to this form-lock connection, the holding devices 15 and 17 can not only be urged outward by outwardly directed pressing forces of the wedge-friction gear 27, but also can be pulled inward by pulling forces directed inward in the direction towards the center line 23. Thus there is obtained a positive coupling of the cutting bits 9 and 11 to the setting bar 21 via the holding devices 15 and 17. In this way, the cutting bits 9 and 11 can be moved securely into their position of rest and thus no longer come into engagement with the surface 5 of the hole.

In FIG. 3 it can furthermore be noted that the cutting bit 9 is fixed by means of a clamping claw 15' on the holding device 15 while the cutting bit 11 is anchored by means of a clamping claw 17' on the holding device 17. The clamping claws 15' and 17' are clamped fast by means of clamping screws 53 and 55, which also engage into the base body 7 of the tool 1 so that an anchoring of the holding devices 15 and 17 in the base body 7 is also assured.

At least one guide ledge is associated with each of the two cutting bits 9 and 11. In the embodiment shown here, two guide ledges are provided in each case. First guide ledges 57 and 59 lag by about 25° behind the cutting bits 9 and 11, while second guide ledges 61 and 63 lag by 90° behind the cutting bits 9 and 11. The lag is referred to the counter-clockwise direction of rotation of the tool 1, designated by A.

During a rotation of the tool 1 in the direction of the arrow A, the cutting bit 11 lying at the bottom in FIG. 3 which is in its working position removes chips from the surface 5 of the hole. These chips pass into a chip space 65 which is formed by a recess in the base body 7 of the tool 1. A corresponding chip space 67 is also provided for the cutting bit 9.

The chips produced upon the machining of the surface 5 of the hole have a thickness which depends on the movement of displacement of the tool 1. The displacement of the cutting bits 9 and 11 effected by the setting device 19, which is also referred to as in-feed, can be selected within a range of 0.005 mm to 2 mm. A displacement of the cutting bit 11 by about 0.05 mm is particularly advantageous, so that an increase in diameter of the hole by about 0.1 mm results after the surface 5 of the hole has been subjected to fine finishing by the cutting bit 11.

Figure 4:
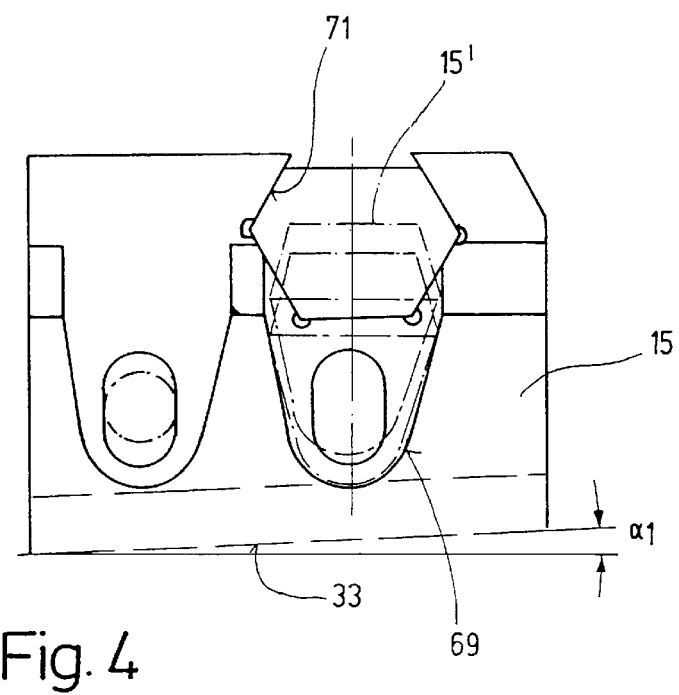
FIG. 4 is a side view of a holding device into which the cutting bits of the boring tool are introduced.

Finally, FIG. 4 shows the holding device 15, by way of example. The holding devices 15 and 17 are ordinarily of similar construction. The holding device 15 has a recess 71 the contour of which is adapted to that of the cutting bit 9. As example, hexagonal cutting bits have been shown here. The recess 71 is accordingly also hexagonal.

A depression 69 is provided in the holding device 15 in which the clamping claws 15', indicated by a dashed line, can be inserted and secured against rotation. The clamping claw 15' is arranged in such a manner that it acts on the front of the cutting bit 9 and presses it against the holding device 15.

In FIG. 4 it is also indicated that the holding device 15 can have two recesses 69 which are arranged alongside of each other. It is therefore conceivable to provide two knife bits one behind the other, seen in the longitudinal direction of the tool 1. Instead of the hexagonal cutting bit, elongated rectangular cutting bits can also be provided, which may then be fixed in place by two clamping claws.

FIG. 4 also shows the oblique surface 33 of the holding device 15 which is part of the wedge-friction gear 27 described on the basis of FIGS. 1 to 3. The oblique surface 35 of the holding device 17 extends with the opposite inclination. In this case, the acute angle $\alpha_1$ opens towards the right, while the angle $\alpha_2$ in the case of the holding device 17 opens towards the left. Reference has been had above in detail, on the basis of FIG. 1, to the opposite directions of opening of the angles $\alpha_1$ and $\alpha_2$.

If the holding devices 15 and 17 are developed as long as can be noted on the basis of FIG. 4, then it is possible to fasten the clamping claws 15' and 17' with a first clamping screw and the holding device 15 or 17 with a second clamping screw, spaced from the first screw, to the base body 7 of the tool 1. In the embodiment described here, the holding device 15 is about 2.5 times as long as the maximum width of the cutting bit 9. The dimensioning can be adapted to the specific design of the tool 1. It is sufficient that the holding device 15 be held reliably in the base body 7 of the tool 1 and be guided as free of play as possible by the setting device 19. The forces of reaction which occur upon the machining of the surface 5 of the hole must be introduced into the tool 1 via the cutting bit and the holding device and via the wedge and oblique surfaces without resulting in movements of the setting device 19.

Accordingly, the following method steps are effective for the fine finishing of hole surfaces 5 in work pieces 3:

During a first movement of the tool 1 in the direction of advance $K_v$, a first cutting bit, in this case the cutting bit 9, is in a working position, while the opposite cutting bit 11 is moved into a position of rest. The position of the cutting bits is determined by a setting device 19, such as explained on the basis of FIGS. 1 to 4. During this first movement, a preliminary machining of the surface 5 of the hole takes place while the tool turns in the counterclockwise direction (see the arrow A in FIG. 3) and is moved in the direction of advance $K_v$ (see the arrow in FIG. 1).

When the first cutting bit 9 comes out of the hole to be machined, the setting device 19 is activated and positively effects the opposite movement of the cutting bits 9 and 11. As a result, the first cutting bit 9 is moved into its position of rest while the second cutting bit 11 is moved into its working position. There thus takes place, so to speak, a switching from preliminary machining to fine finishing when the cutting bits are moved out of the hole or are no longer in engagement with the surface 5 of the hole. For this purpose, the setting bar 21, as indicated by an arrow in FIG. 2, is acted on by a force $F_v$ and moves forward by a distance H in the direction towards the end 37 of the tool 1. The direction of movement of the setting bar 21 depends on the selection of the angle of inclination of the wedge and oblique surfaces of the wedge-friction gear 27.

After the cutting bits 9 and 11 have been subjected to movement in opposite direction with respect to the center line 23, a reversal of movement of the direction of advance of the tool 1 also takes place. During the return travel of the tool 1 in the direction of the arrow $V_e$ shown in FIG. 2, a final machining of the surface 5 of the hole is effected by the cutting bit 11, while the first cutting bit 9 does not contact the surface of the hole.

A displacement of the cutting bits therefore takes place, on the one hand, before the preliminary machining of the surface 5 of the hole and before its final machining. During the machining, the setting device 19 is not actuated.

After the end of the return movement, the setting device 19 is again activated so that now again the first cutting bit 9 is moved into its working position while the second cutting bit 11 is returned into its position of rest. It is now possible to machine the surface 5 of the hole of another work piece 3. Between two machining steps the cutting bits or their holding devices are displaced by 0.005 mm to 2 mm. A displacement by about 0.05 mm advantageously takes place before the final machining so that there is a difference in diameter of about 0.1 mm between preliminary and final machining.

It is thus shown that a single tool can be used for the preliminary and final machining of one and the same work piece. A change of tools is no longer necessary. This leads to a substantial saving in time upon the machining of work pieces. Furthermore, it is found that two operating steps can be carried out during one forward and backward movement of the tool, namely first of all a preliminary machining and then, during the return movement, a fine finishing machining of the surface 5 of the hole. This also leads to a considerable saving in time since two operations can take place upon the forward and return movement of the tool.

The preliminary machining of the work piece therefore takes place in the forward travel, the cutting bit 9 acting as a so-called "pushing knife". The final machining of the work piece takes place in the return travel, the cutting bit 11 acting as so-called "drawing knife". Thus, a hole surface of particularly good quality is obtained, so that a fine finishing of the hole is obtained.

Since the cutting bit 9 is in the front region of the holding device 15, referred to the direction of advance, a so-called follow-up results from the guide ledges 57 and 61, the length of which is substantially greater than the width of the cutting bit. The guide ledges guide the tool 1 therefore into a region which lags, as referred to the direction of advance, behind the cutting bit 9.

Also in the case of the holding device 17, the cutting bit 11 is arranged in the right-hand region close to the end 37 of the tool 1. The guide ledges 59 and 63 of the cutting bit 11 extend to the left far beyond the cutting bit 11 so that a so-called pre-guidance results, which leads to a particularly uniform quality of the surface of the hole.

The tool 1 is coupled in customary manner with a machine tool. The advance and withdrawal movement of the setting bar is also produced in traditional manner.

It is furthermore conceivable to associate with the setting bar 21 a drive which is arranged completely within the tool 1 and consists, for instance, of an electric motor which moves the setting bar 21 forward and backward via a threaded rod. Such a development simplifies the change of the tool 1 and also permits automatic change of the tool.

Figure 5:
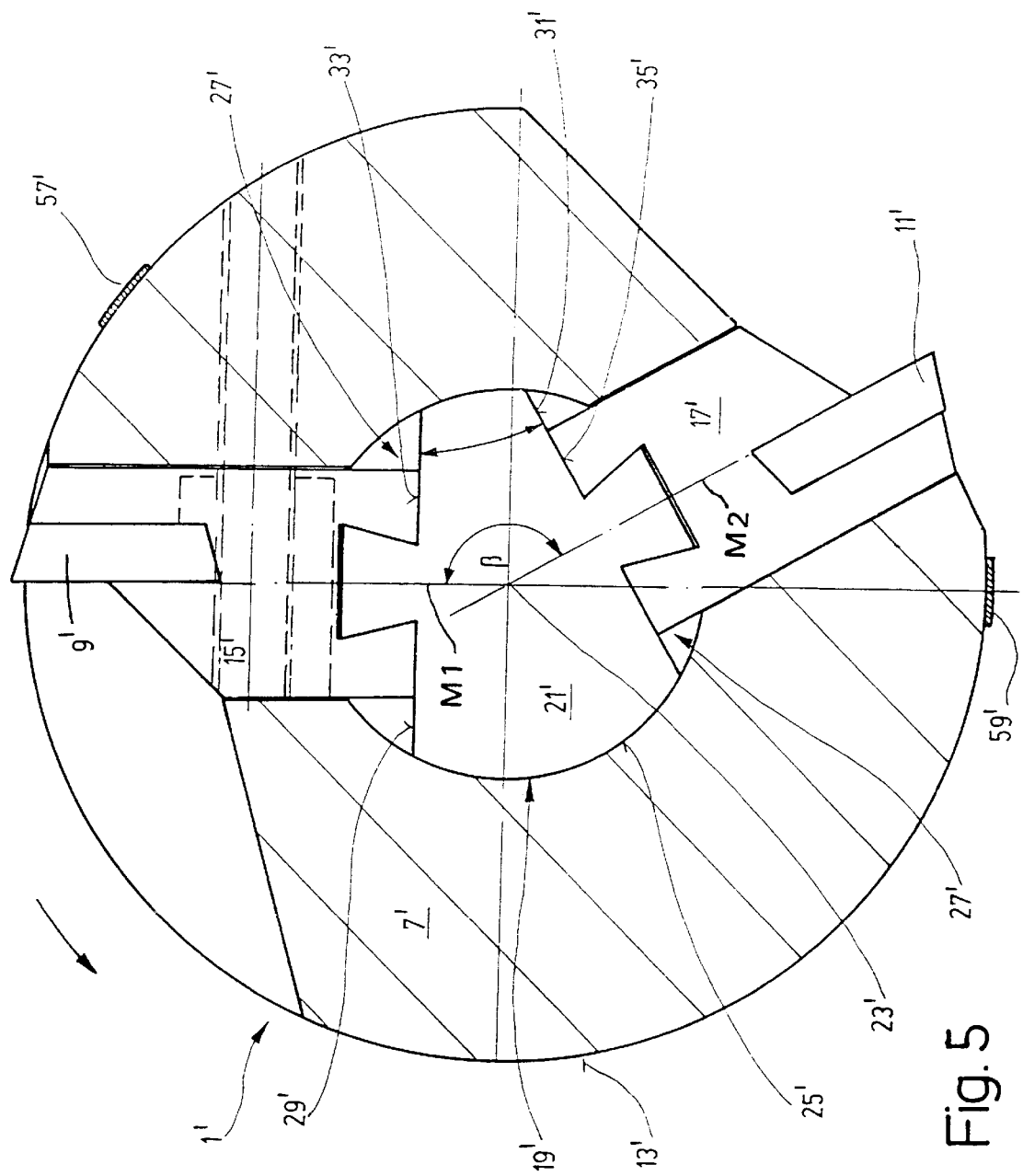
FIG. 5 is a cross-sectional view through the front end of a second embodiment of a boring tool.

FIG. 5 shows a cross-section through a boring tool, referred to hereinafter as tool 1', having a base body 7' into which in this case two cutting bits 9' and 11' are inserted. In their working position, the cutting bits extend beyond the circumferential surface 13' of the tool 1' and can machine the surface of a hole in a work piece. In the embodiment shown here, the first cutting bit 9' described above is shown in its working or extracted position while the second cutting bit 11' is in its retracted position of rest.

The cutting bits are inserted in holding devices 15' and 17' and clamped fast to them in known manner, for instance by means of at least one clamping screw.

The tool 1' is provided with a setting device 19' which comprises a setting bar 21'. The latter is mounted displaceably in a recess 25' in the base body 7' extending here concentric to the center line or axis of rotation 23' of the tool 1'. The movement of displacement of the setting bar 21' takes place in or opposite the direction of the center line 23'. The setting bar 21' forms a wedge-friction gear 27' either directly with the cutting bits 9' and 11' or—as shown here—with the holding devices 15' and 17' associated with the cutting bits. For this purpose, the setting bar 21' is provided with wedge surfaces 29' and 31' which cooperate with oblique surfaces 33' and 35' on the holding devices 15' and 17'.

The wedge surfaces 29' and 31' as well as the oblique surfaces 33' and 35' are not parallel to each other. They form an angle greater than 0° with each other. This angle can lie within a range of 10° to 60° and particularly 20° to 40°. However, an angle of 30° has proven particularly suitable. In corresponding manner, the second cutting bit 11' lags—in the direction of rotation of the tool indicated by an arrow —behind the first cutting bit 9' by an angle β of 150°. Corresponding to what has been stated above, this angle can lie within a range of 170° to 130°, and in particular 160° to 140°. An angle β of 150° has proven particularly suitable. It is essential that the angle β be less than 180°.

Due to the fact that the two cutting bits 9' and 11' are not arranged diametrically opposite each other, it is possible to associate a guide ledge 59' with the first cutting bit 9', said wedge being arranged diametrically opposite the first cutting bit 9'. It is essential that this guide ledge 59' form a support for the first cutting bit 9' while the latter is machining the surface of the hole.

There is furthermore provided a guide ledge 57' which lags behind the first cutting bit 9'.

Upon the machining of the surface of a hole with the first cutting bit 9', the tool therefore can be supported not only on the cutting bit 9' but also on the two guide ledges 57' and 59'. Upon a machining of the surface of the hole with the second cutting bit 11', the first cutting bit 9' is in its retracted position, so that the tool 1' rests not only on the second cutting bit 11' but also on the guide ledge 59' lagging behind the second cutting bit 11' and the guide ledge 57'.

Upon a displacement of the setting bar 21', an opposite positioning of the cutting bits 9' and 11' with respect to the center line 23' takes place: While the first cutting bit 9' is moved outward, the second cutting bit 11' is moved inward so that the latter does not contact the surface of the hole. Upon an opposite movement of the setting bar 21', the second cutting bit 11' is moved out while the first cutting bit 9' is moved in. The two cutting bits 9' and 11' and their holding devices 15' and 17' are positively coupled with the setting bar 21' and are displaceable in the base body 7' with respect to the circumferential surface 13' thereof. This is assured here by a dovetail connection. The cutting bits are associated such that they are displaceable by the setting device in opposite directions with respect to the axis of rotation or center line of the tool, the setting device in each case displacing one cutting bit into a working position and the other cutting bit into a position of rest.

In the tool, the cutting bits are so displaced with respect to each other that the second cutting bit lags behind the first, as seen in the direction of rotation of the boring tool, by an angle β which is less than 180°. The angle β is preferably 170° to 130° and in particular 160° to 140°. There is associated with the first cutting bit at least one guide ledge which lags behind the second cutting bit and which supports the first cutting bit in the hole to be machined.

The cutting bits and guide ledges are so arranged in the base body 71 of the tool 1' that, upon an advance movement, while the first cutting bit 9' comes into engagement with the wall of the hole, a leading guidance is present, while upon a return movement of the tool 1', upon which a second cutting bit 11' comes into contact with a wall of the hole, a lagging guidance is present.

The tool 1' is particularly suitable for the machining of the surface of a hole in a connecting rod in which case, during an advancing movement, a preliminary or basic machining of the surface of the hole takes place, while upon a return movement of the tool 1', a fine finishing of the surface of the hole is effected by the second cutting bit 11'.

If a longitudinal section were taken through the tool 1' shown in FIG. 5, which lies, on the one hand in a first plane which coincides with the central plane M1 of the holding device 15' and, on the other hand, in a second plane which coincides with the central plane M2 of the holding device 17', then the features shown in FIGS. 1 and 2 result also here. To this extent, therefore, the tools 1 and 1' agree with each other. The explanations given with regard to FIGS. 1 and 2 can therefore be applied, along with the explanations of FIG. 3, to the tool 1' shown in FIG. 5.

From what has been stated, it is understood that, in principle, also more than two cutting bits can be provided in a tool 1, 1', for being moved inward and outward by a setting device. However, particularly high strength of the tool results if only two cooperating cutting bits are provided, arranged preferably diametrically or approximately diametrically (see FIG. 5) opposite each other so that particularly simple control by a single setting device is possible.

Although the present invention has been described in relation to particular embodiments thereof, many other variations and modifications and other uses will become apparent to those skilled in the art. Therefore, the present invention is not limited by the specific disclosure herein.

What is claimed is:

1. A boring tool for the fine finishing of a surface of a hole, comprising:

two cutting bits;

a setting device which is positively coupled with said two cutting bits for setting them in respective positions; said cutting bits being arranged for being displaceable by the setting device in a base body with respect to a circumferential surface thereof; the cutting bits being displaceable in different directions, with respect to a center line of the boring tool; and wherein the setting device substantially simultaneously displaces one cutting bit into a working position engaging said surface and the other cutting bit into a position of rest not engaging said surface.

2. A boring tool according to claim 1, wherein the cutting bits are displaceable in respective direction radial to the center line.

3. A boring tool according to claim 1 or 2, wherein the cutting bits are arranged in holding devices which are mounted displaceably in the radial direction in grooves arranged in the circumferential surface of the base body and which are coupled to the setting device.

4. A boring tool according to claim 1 or 2, wherein the cutting bits are arranged diametrically opposite each other.

5. A boring tool according to claim 1 or 2, further comprising two guide ledges associated respectively with said cutting bits.

6. A boring tool according to claim 1 or 2, wherein the setting device includes a setting bar extending in the direction of the center line of the boring tool.

7. A boring tool according to claim 6, wherein the setting bar forms a wedge-friction gear with the holding devices and has wedge surfaces which are associated with the holding devices and cooperate with oblique surfaces arranged on the holding devices.

8. A boring tool according to claim 7, wherein the oblique surfaces form substantially identical angles with the center line of the setting bar but face in opposite longitudinal directions.

9. A boring tool according to claim 3, wherein the setting device is coupled by a form lock connection with the cutting bits and the holding devices.

10. A boring tool according to claim 9, wherein said coupling is by a dovetail connection.

11. A boring tool according to claim 1, wherein the distance of displacement of the cutting bits produced by the setting device is 0.005 mm to 2 mm.

12. A boring tool according to claim 1, wherein the cutting bits are arranged staggered circumferentially with respect to each other, the second cutting bit lagging behind the first cutting bit, in a direction of rotation of the boring tool, by an angle β of less than 180°, and at least one guide ledge is associated with the first cutting bit and said guide ledge lags behind the second cutting bit and supports the first cutting bit in a hole to be finished.

13. A boring tool according to claim 12, wherein the second cutting bit lags behind the first cutting bit by 150°.

14. A boring tool according to claim 12 or 13, further comprising a diametrically opposite guide ledge associated with the first cutting bit.

15. A method for the fine finishing of the surface of a hole by means of a boring tool, comprising the steps of:

a preliminary machining of the surface of the hole during a first movement of the boring tool along its center line, and final machining of the hole during a second, opposite movement of the boring tool;

during the first movement, moving the first cutting bit into its working position and moving the second cutting bit into its position of rest, and during the second movement, moving the first cutting bit into its position of rest and moving the second cutting bit into its working position.

16. A method according to claim 15, wherein the preliminary machining of the surface of the hole is effected during a forward movement and the final machining is effected during a return movement of the boring tool.

17. A method according to claim 15 or 16, wherein the moving of the cutting bits takes place between said two successive machining steps.

18. A method according to claim 15 or 16, wherein the cutting bits are displaced by 0.005 mm to 2 mm between said two positions thereof.

19. A boring tool according to claim 11, wherein said displacement distance is about 0.05 mm.

20. A boring tool according to claim 12, wherein said angle is 170° to 130°.

21. A boring tool according to claim 20, wherein said angle is 160° to 140°.

22. A method according to claim 18, wherein the cutting bits are displaced by about 0.05 mm.

23. A method according to claim 17, wherein the cutting bits are displaced by 0.005 mm to 2 mm between said two positions thereof.

24. A method according to claim 23, wherein the cutting bits are displaced by about 0.05 mm.

\* \* \* \* \*